(12) United States Patent
Tian et al.

(10) Patent No.: US 8,864,033 B2
(45) Date of Patent: Oct. 21, 2014

(54) ROBUST DECODING OF COLOR BARCODE PRINTED WITH EXTREMELY SMALL DATA CELLS

(71) Applicants: Yibin Tian, Menlo Park, CA (US); Xiaonong Zhan, Foster City, CA (US); Wei Ming, Cupertino, CA (US)

(72) Inventors: Yibin Tian, Menlo Park, CA (US); Xiaonong Zhan, Foster City, CA (US); Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 61 days.

(21) Appl. No.: 13/687,921

(22) Filed: Nov. 28, 2012

(65) Prior Publication Data

US 2014/0144991 A1 May 29, 2014

(51) Int. Cl.
- G06K 19/08 (2006.01)
- G06K 7/14 (2006.01)
- G06K 19/06 (2006.01)

(52) U.S. Cl.
CPC ............ G06K 7/1417 (2013.01); G06K 7/1443 (2013.01); G06K 7/1447 (2013.01); G06K 2019/06225 (2013.01); G06K 7/1456 (2013.01)
USPC .................................. 235/462.04; 235/462.1

(58) Field of Classification Search
CPC ........................... G06K 19/06037; G06K 7/14
USPC ...................... 235/462.04, 462.09–462.1, 494
See application file for complete search history.

(56) References Cited

U.S. PATENT DOCUMENTS

| 5,818,032 | A | * | 10/1998 | Sun et al. ....................... 235/494 |
| 7,751,585 | B2 | | 7/2010 | Jancke |
| 7,913,922 | B1 | | 3/2011 | Roth |
| 2005/0023354 | A1 | * | 2/2005 | Sali et al. .................. 235/462.04 |
| 2007/0278303 | A1 | * | 12/2007 | Cattrone ..................... 235/462.1 |
| 2011/0186632 | A1 | * | 8/2011 | Yi et al. ......................... 235/437 |

OTHER PUBLICATIONS

Parikh, et al., "Localization and Segmentation of a 2D High Capacity Color Barcode", IEEE Workshop on Applications of Computer Vision, 2008, WACV 2008, pp. 1-7.
Mayer et al., "Design of High Capacity 3D Print Codes Aiming for Robustness to the PS Channel and External Distortions", IEEE, 2009, pp. 105-108.
Querini et al., "Color Classifiers for 2D Color Barcode", Proceedings of the 2013 Federated Conference on Computer Science and Information Systems, 2013, pp. 611-618.

* cited by examiner

*Primary Examiner* — Daniel St Cyr
(74) *Attorney, Agent, or Firm* — Chen Yoshimura LLP

(57) ABSTRACT

A method for decoding digital data in a color barcode having a plurality of data cells, including the steps of: scanning the color barcode of the hardcopy document, separating color image of the color barcode into print primary color planes, computing peaks of each print primary color plane, projecting, for at least one of the print primary color planes, the data cells along a horizontal direction and a vertical direction at the peaks of the at least one of the primary color planes in each direction which represent data cell center locations respectively, and creating a grid where each of its intersection is a respective data cell center location, assigning a color to each grid intersection which corresponds to a respective data cell by examining values of the print primary color planes at such location, and decoding digital data from the data cells based on the respective color assigned to each data cell.

28 Claims, 3 Drawing Sheets

ROBUST DECODING OF COLOR BARCODE PRINTED WITH EXTREMELY SMALL DATA CELLS

BACKGROUND OF THE INVENTION

1. Field of the Invention

This invention generally relates to decoding of color barcodes, and more particularly it relates to a method for robust decoding of color barcode printed with extremely small data cells.

2. Description of Related Art

Color barcodes are a widely used type of machine-readable symbology for recording digital data. Typically in a two dimensional (2D) barcode, a given area is divided into small cells, where a majority of the cells are used to encode data, which are often referred to as "data cells", and a small portion of the cells are used for locating and decoding the barcode, which for example include the "locators" or "locator cells", etc. Each data cell may have a number of data representations. For example, if only black and white colors are used for the cells, then each cell has two data representations. However, if gray-scale is used for the cells, then each cell can have three or more data representations. In addition, more color schemes have been used for color barcode cells to improve their data capacities by increasing the possible number of data representations of each data cell.

Generally, a number of factors may affect the Data Capacity of a color barcode, including: (1) the Resolution, which may be measured by pixels per inch or "ppi"; (2) the Cell Area, which determines the number of pixels per cell; (3) the Number of Representations of each data cell; and (4) the Data Ratio, which is the number of data cells divided by the total number of cells in a barcode. The relationship between these factors can be expressed as:

$$\text{Data Capacity}\left(\frac{\text{Bit}}{\text{Inch}^2}\right) = \frac{(\text{Resolution})^2}{\text{Cell Area}} \times \log_2(\text{Num of Representations}) \times (\text{Data Ratio})$$

When the shape of the cells is square, the above equation may be written as:

$$\text{Data Capacity}\left(\frac{\text{Bit}}{\text{Inch}^2}\right) = \left[\frac{\text{Resolution}}{\text{Cell Width (Num of pixels)}}\right]^2 \times \log_2(\text{Num of Representations}) \times (\text{Data Ratio})$$

In general, resolution is limited by hardware, and the potential improvement of data ratio is also limited. To increase the data capacity of a color barcode, either the cell area is reduced to increase the number of data cells or the number of representations of each data cell is increased. In both cases, it is important to have a reliable decoding technique to ensure that the encoded data can be decoded with minimum errors. For the approach of reducing the cell area to increase data capacity, it is desirable to have a robust decoding mechanism for decoding color barcode printed with extremely small data cells.

SUMMARY OF THE INVENTION

The present invention is directed to color barcode printed with extremely small data cells.

An object of the present invention is to provide a robust decoding method for color barcode printed with extremely small data cells, for example, data cells that are 5×5 pixel squares.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, one exemplary embodiment of the present invention provides a method for robust decoding of color barcode printed with extremely small data cells, including the steps of: scanning the color barcode of the hardcopy document, separating color image of the color barcode into print primary color planes, computing peaks of each print primary color plane, projecting, for at least one of the print primary color planes, the data cells along a horizontal direction and a vertical direction at the peaks of the at least one of the primary color planes in each direction which represent data cell center locations respectively, and creating a grid where each of its intersection is a respective data cell center location, assigning a color to each grid intersection which corresponds to a respective data cell by examining values of the print primary color planes at such location, and decoding digital data from the data cells based on the respective color assigned to each data cell.

In one exemplary embodiment of the present invention, the print primary colors are C, M, Y and K colors, and the at least one of the print primary color planes is the K plane.

In an additional aspect, the present invention providing the steps of printing a color barcode that can be used in accordance with the decoding scheme described above, where the printing steps utilizes "locator" cells for localizing the barcode and providing both the color reference to the K color plane and the spatial reference to the color spatial drifts of the C, M and Y color planes, and also utilizes "color reference" cells for providing reference to both the spatial drifts of different colors and the color drifts.

In another aspect, the present invention provides a non-transitory computer readable recording medium having a computer readable program code embedded therein for controlling a data processing apparatus, the computer readable program code configured to cause the data processing apparatus to execute the process of the above method.

In a further aspect, the present invention provides a system configured to cause a data processing apparatus to execute the process of the above method.

It is to be understood that both the foregoing general description and the following detailed description are exemplary and explanatory and are intended to provide further explanation of the invention as claimed.

DETAILED DESCRIPTION OF THE PREFERRED EMBODIMENTS

As mentioned earlier, the present invention is directed to a robust decoding method for color barcode printed with extremely small data cells.

Figure 1:
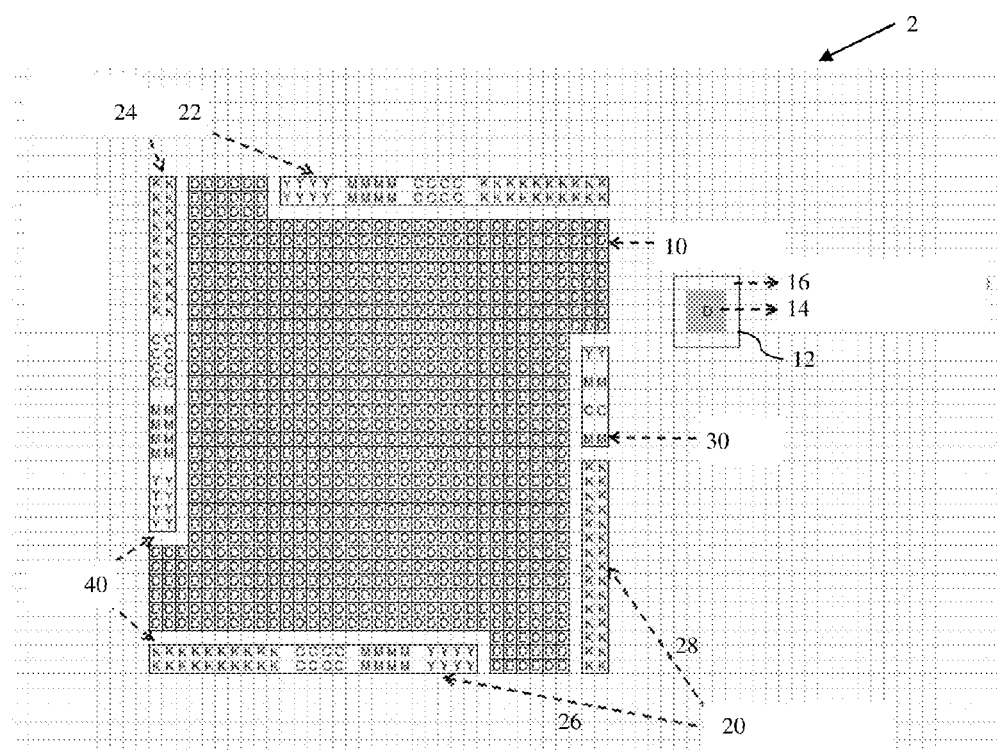
FIG. 1 is an illustration of an exemplary color barcode printed with extremely small data cells according to embodiments of the present invention.

Referring to FIG. 1, there is illustrated an exemplary color barcode 2 printed with extremely small data cells according to embodiments of the present invention. As an example, the small cells of color barcode 2 are 5×5 pixel squares. These small cells include data cells 10, locator and color reference cells 20, barcode size indicator cells 30 and spacer cells 40.

For illustration purpose, an enlarged data cell 12 is shown in FIG. 1 to clearly demonstrate that each 5×5 pixel data cell has a 3×3 pixel color portion 14 at its center, surrounded by 1 pixel wide white portions 16 on each side which reduce color interference effect between adjacent data cells.

Although each data cell 10 has white portions 16 surrounding the color portion 14, the shape of the white portion 16 can be arbitrary as far as the color portions 14 of neighboring data cells 10 can be discontinuous by the white portions 16. For instance, an L shaped white portion may be applied to each data cell 10. Further to this, the width of the white portion(s) 16 between the neighboring data cells 10 can be determined based on the scanning resolution, if it is already known. In case of using a scanner that has a higher scanning resolution comparing to the pixel resolution of the color barcode 2, one pixel width of the white portion may be wide enough to detect the colors of data cells 10 correctly.

The locator and color reference cells 20 are arranged along the corners and edges of the color barcode 2. As an example, the locator and color reference cells 20 include locator and multi-color reference cells 22, 24 and 26. The multiple colors may include cyan (C), magenta (M), yellow (Y) and black (K), which are primary colors when printing the color barcode 2. In other words, in a certain embodiment, the color barcode 2 were printed with a color printer using C, M, Y, and K toning materials, such as toners and inks. The locator and color reference cells 20 may also include single-color reference cells 28 where only one color (such as black K) is used.

The barcode size reference cells 30 are arranged along an edge of the color barcode 2. They contain information about the overall size (e.g., in number of cells in each direction) of the color barcode 2. For barcode size reference cells 30, multiple colors or alternatively a single color may be used. For example, cell 30 may be black and white only; or alternatively, cell 30 may use one of the C, M and Y colors and white only.

The spacer cells 40 are provided between the data cells 10 and the locator and reference cells 20 and 30 to reduce color interference effect between adjacent cells.

Figure 2A:
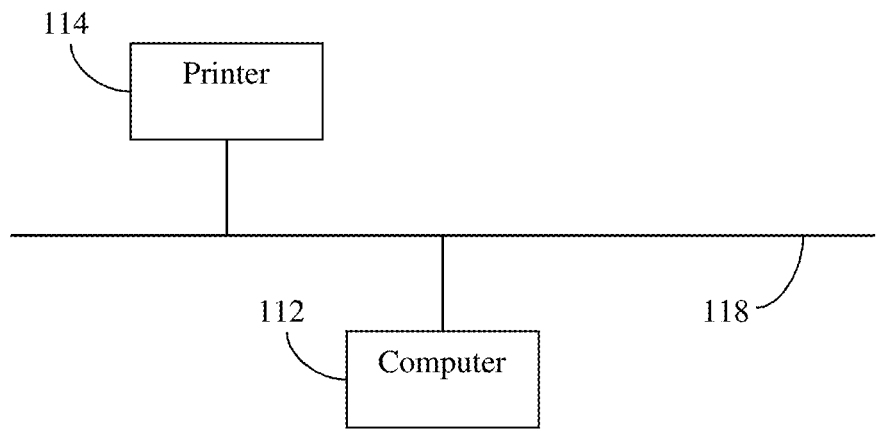
FIG. 2(a) is a schematic diagram illustrating a color barcode encoding and printing system in which embodiments of the present invention may be implemented.
Figure 2B:
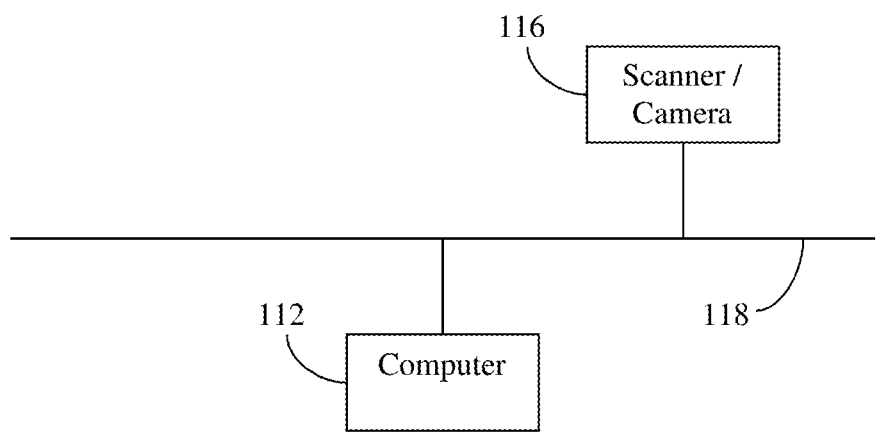
FIG. 2(b) is a schematic diagram illustrating a color barcode scanning and decoding system in which embodiments of the present invention may be implemented.

Referring to FIGS. 2(a) and 2(b), there are illustrated exemplary systems in which the methods of the present invention may be implemented. In the exemplary embodiment shown in FIG. 2(a), the system may include a computer 112 and a printer 114 connected to each other by a network or other wired or wireless communication link 118. In one embodiment of the present invention the computer 112 is loaded with a program for encoding a color barcode (such as the color barcode 2 shown in FIG. 1) in accordance with the embodiments of the present invention. In another embodiment of the invention the printer 114 has a processor and a read-only memory (ROM) loaded with a program for rendering the color barcode 2 in accordance with the embodiments of the present invention. Alternatively the printer 114 may be a stand-alone printer not connected with the computer 112.

In the exemplary embodiment shown in FIG. 2(b), the system may include a computer 112 and a scanner or camera 116 connected to each other by a network or other wired or wireless communication link 118. In one embodiment of the invention the computer 112 is loaded with a program for decoding a color barcode (such as the color barcode 2 shown in FIG. 1) in accordance with the embodiments of the present invention. In another embodiment of the invention the scanner or camera 116 has a processor and a ROM loaded with a program for capturing the color barcode 2 in accordance with the embodiments of the present invention. Alternatively the scanner or camera 116 may be a stand-alone scanner or camera not connected with the computer 112.

In practical implementations, the encoding and decoding process may be carried out at different locations, and the printer 114 and scanner (or some other imaging device, such as camera) 116 do not necessarily communicate with each other at the same time. For example, advertisers may print barcodes on the product packages, commercials or fliers, and customers can simply read the barcodes with their smart phone cameras to obtain pricing and/or additional information about the products encoded in the barcodes.

In addition, although the exemplary embodiments of the present invention for robust decoding of color barcode printed with extremely small cells may be implemented in a print-scan loop, it is understood that computers, printers and/or scanners/cameras can each individually function to perform certain part of the exemplary process of the present invention method. For example, a computer may be used to generate/encode and/or decode a barcode, a printer may be used to generate and/or print a barcode, while a scanner or a camera may be used to read and/or decode a barcode. From a practical point of view, it is not necessary to have all of the devices connected in a network or connected to each other. Furthermore, multifunction printers (MFP) and All-In-One (AIO) devices may be used in place of the printers or scanners/cameras for generating and/or capturing color barcodes.

Figure 3:
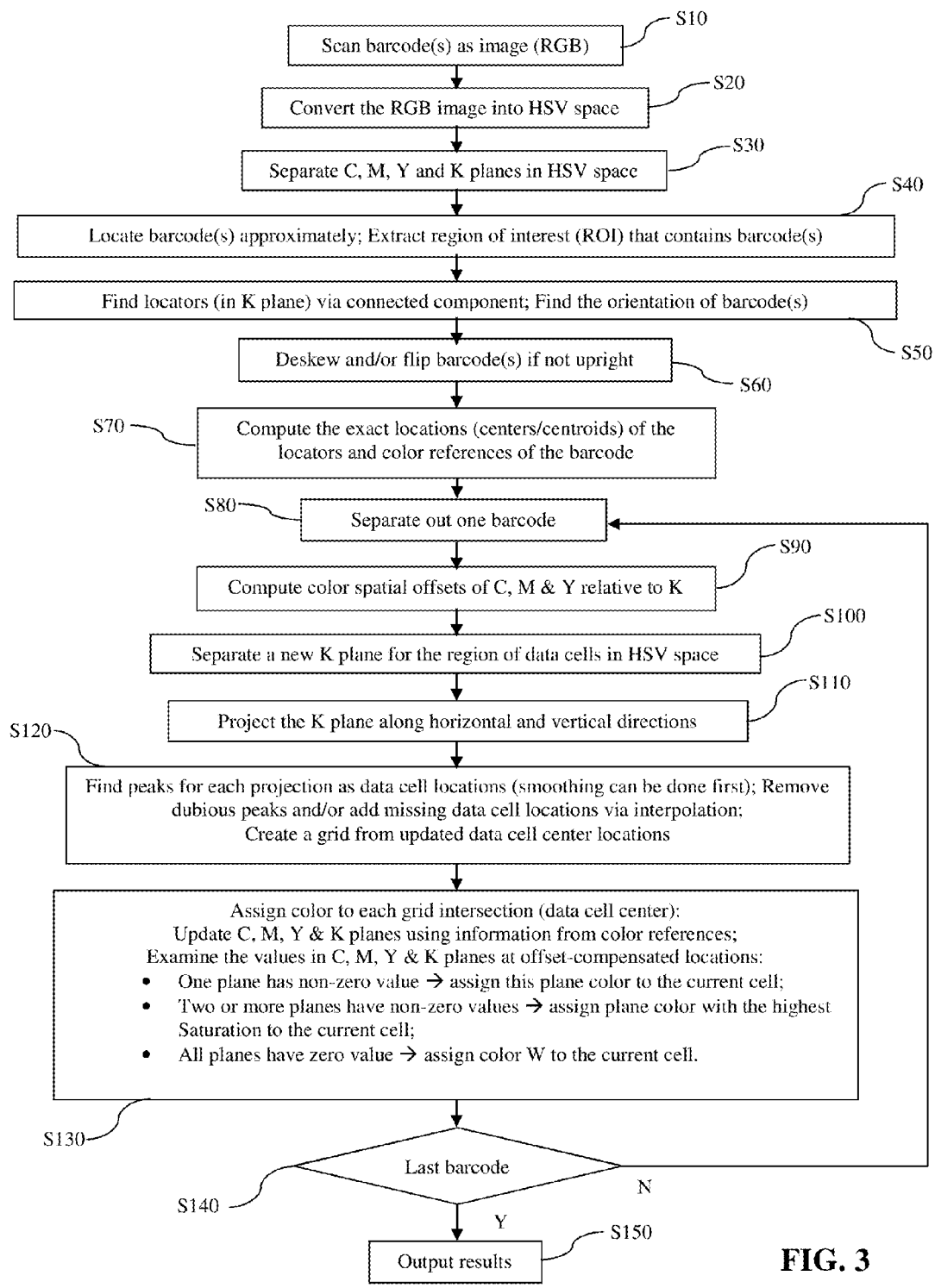
FIG. 3 is a flowchart illustrating the steps of the method for robust decoding of color barcode printed with extremely small data cells according to embodiments of the present invention.

Referring to FIG. 3, there are illustrated the exemplary steps of the method for robust decoding of color barcode printed with extremely small data cells according to embodiments of the present invention. First, a color barcode (as illustrated in FIG. 1) is created with extremely small cells in the CMYK color space. As discussed earlier, in addition to the data cells, it also includes locators, color references, barcode size area, and spacers. These non-encoding cells all have their own auxiliary roles during the decoding process. In the CMYK color space, five colors are used: cyan (C), magenta (M), yellow (Y), black (K) and white (W). Of course other cell sizes and color options may be used as well.

The above steps may be carried out by the system shown in FIG. 2(a). As described above, according to embodiments of the present invention, color barcode 2 may be printed by a printer once it is encoded by executing a color barcode rendering software program, which may reside on a computer connected to one or more printers or on a printer itself (such as the computer 112 and printer 114 shown in FIG. 2(a)), or on a color barcode generating device. The program is executed by a central processing unit (CPU) of the computer or by a data processor or processing unit of the printer or device. Data or other information used when executing the encoding program may be stored in and retrieved from a memory or storage unit of the computer, printer or device.

The following steps may be carried out by the system shown in FIG. 2(b). As also described above, color barcode 2 may be scanned by a scanner or camera, and then decoded by executing a color barcode decoding software program, which may reside on a computer connected to one or more scanners/cameras or on the scanner/camera itself (such as the computer 112 and scanner/camera 116 shown in FIG. 2(b)), or on a color barcode decoding device. The program is executed by a CPU of the computer or by the data processor or processing unit of the scanner or device. Data or other information used when executing the decoding program may be stored in and retrieved from a memory or storage unit of the computer, scanner or other imaging device.

Referring back to FIG. 3, at Step S10 the printed color barcode is scanned in the RGB (Red, Green and Blue) color space, as most scanners work in the RGB space by default. At Step S20, the scanned image is converted to the HSV (Hue-Saturation-Value) color space. Of course other color spaces, such as the HLS, Lab, LCH color spaces, etc., may be used as alternatives for implementation of this invention.

At Step S30, the C, M, Y and K planes are separated in the HSV space. First, the K planes are extracted from the Value (V) channel with a first threshold T1. Then three peaks for C, M and Y planes are extracted approximately from the Hue (H) channel through histograms, a Saturation (S) threshold (T2) can also be used to help to separate each color (C, M and Y) plane, where different ranges are assigned to each primary color. These ranges and thresholds (T1 and T2) may be predetermined empirically.

At Step S40, the color barcode is located progressively. First, the color barcode is located approximately, and a region of interest (ROI) containing the color barcode is cut out. Then at Step S50 the locators in K plane are found by using a connected component analysis, and the orientation of the barcode is determined through the orientation of the longest locator(s). At Step S60 the ROI is de-skewed accordingly and flipped if necessary. At Step S70 the exact locations (centers/centroids) of the locator and color reference cells are computed, and the size of the color barcode is decoded, so that the color barcode can be accurately extracted from the ROI. At Step S80 one single color barcode is separated out.

At Step S90 the spatial offsets of color channels (C, M and Y) relative to K are computed as $(dX_C, dY_C)$, $(dX_M, dY_M)$ and $(dX_Y, dY_Y)$ respectively from the color reference locations In order to decode data cells correctively, they must be correctly located/identified. At Step S100 a new K plane is separate from the Value channel with another threshold T3 (which is smaller than T1) for the region of data cells. The threshold T3 may be derived from the color reference or predetermined empirically. At Step S110 the new K plane is projected along horizontal and vertical directions (X and Y) respectively.

At Step S120 the peaks of projection profiles for each direction (X, Y) are found. The locations $D_{XY}$ of these peaks represent the centers of data cells. The projection profiles may be smoothed and/or filtered before finding the peaks. The distances between all neighboring $D_{XY}$ are examined with the knowledge of cell and barcode sizes. Dubious peaks (e.g., two peaks are too close) are removed from $D_{XY}$ locations, missing cell locations (e.g., two peaks are too far apart) are added to the $D_{XY}$ locations via interpolation, and a grid is created from the updated $D_{XY}$ locations.

At Step 130, a color is assigned to each intersection $(X_0, Y_0)$ on the grid as follows. First, the C, M, Y and K planes are updated using information from the color reference cells. The C, M, Y and K segmentation of Step S30 can be fine-tuned using ranges and thresholds derived from the color references, that is, Step S30 may be repeated if necessary with updated ranges and thresholds. Then the C, M, Y and K values are examined at the following offset-compensated locations:

$(X_C, Y_C) = (X_0, Y_0) + (dX_C, dY_C)$  C plane:

$(X_M, Y_M) = (X_0, Y_0) + (dX_M, dY_M)$  M plane:

$(X_Y, Y_Y) = (X_0, Y_0) + (dX_Y, dY_Y)$  Y plane:

$(X_K, Y_K) = (X_0, Y_0)$  K plane:

Here are the rules of assigning a color at each intersection $(X_0, Y_0)$ on the grid:

First, assign the color at $(X_0, Y_0)$ the same as the color plane having a non-zero value at its given location if there is only one such plane;

However, if there are two or more planes having non-zero values at their given locations, assign the color at $(X_0, Y_0)$ same as the plane color that has the highest Saturation;

If all planes are zeros at the given locations, assign the color at $(X_0, Y_0)$ as white (W).

Once all data cells are assigned with a color, the color barcode can be decoded accordingly. Digital data is obtained from the segmented data cells based on the recognition of the respective colors assigned to the data cells where each color represents a data item or a data value. The process of decoding digital data from the color representations of data cells may be performed by a barcode decoding software program. As mentioned earlier, a color barcode decoder program may reside on a computer connected to one or more scanners/cameras, or on a scanner or camera itself, and the robust color barcode decoding method described above may be implemented by a computer software program running on a computer, a printer, a scanner or camera, and/or other data processing apparatus.

At Step S140 it is determined whether the last color barcode is processed and if so, at Step S150 the final result of the decoding will be output.

Although, in the abovementioned embodiment, the exact grids for K plane is directly examined (Steps 100, 110, and 120) and the grids for C, M, and Y planes are found by using the respective offsets from K plane (Step 130), the grids for C, M, and Y planes can be directly examined by using the same computations of Steps 100, 110, and 120, instead of using the Step 130. This alternative way has an advantageous over the abovementioned embodiment in that the grids for C, M, and Y planes can be calculated more precisely, though such computation would take more time than the case where the respective offsets are used.

It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A method for decoding digital data in a color barcode printed on a hardcopy document, wherein the color barcode has a plurality of data cells each having a color that encodes data, and a plurality of reference cells with known colors located along each side of a border of the color barcode, comprising the steps of:
    scanning the color barcode of the hardcopy document to obtain a color image;
    separating the color image of the color barcode into print primary color planes;

computing spatial offsets among the print primary color planes using the reference cells on the border;

projecting, for a first one of the print primary color planes, the data cells along a horizontal direction and a vertical direction to find peaks in each direction which represent data cell center locations respectively, and based on locations of the peaks, creating a grid where each of its intersection is a respective data cell center location;

computing offset-compensated locations of grid intersections for each of the print primary color planes other than the first print primary color plane, by adding to the grid intersections the spatial offsets of the other print primary color plane relative to the first print primary color plane;

assigning a color to each grid intersection which corresponds to a respective data cell by examining values of the first print primary color plane at such location and values of each of the other print primary color planes at the respective offset-compensated locations; and decoding digital data from the data cells based on the respective color assigned to each data cell.

2. The method of claim 1, wherein the step of separating the print primary color planes comprises converting the color image to an HSV (Hue-Saturation-Value) or HSL (Hue-Saturation-Lightness) color space, and extracting a black (K) color plane from a V or L channel of the HSV or HSL color space with a first threshold.

3. The method of claim 2, wherein the step of separating the print primary color planes further comprises extracting peaks for the print primary color planes respectively from an H channel of the HSV or HSL color space.

4. The method of claim 1, wherein the projecting step includes examining distances between data cell center locations in each direction to remove dubious peaks and/or to add missing data cell center locations by interpolation.

5. The method of claim 1, wherein the step of assigning a color assigns a color to a grid intersection the same as a color plane having a non-zero value at the grid intersection when there is only one color plane having a non-zero value at the grid intersection, assigns a color to a grid intersection the same as a color plane having a highest value at the grid intersection when there are two or more color planes having non-zero values at the grid intersection, or assigns white color to a grid intersection when there is no color plane having a non-zero value at the grid intersection.

6. The method of claim 1, wherein at least one of the reference cells is a locator cell having a black color, the method further comprising localizing the color barcode using the locator cell.

7. The method of claim 1, wherein the step of separating the print primary color planes is performed using all data cells.

8. The method of claim 7, further comprising, before the assigning step, updating the separation of color barcode into print primary color planes using color information from the reference cells, and wherein the assigning step is performed using the updated print primary color planes.

9. A method for decoding digital data in a color barcode printed on a hardcopy document, wherein the color barcode has a plurality of data cells, comprising the steps of:

scanning the color barcode of the hardcopy document to obtain a color image;

separating the color image of the color barcode into print primary color planes;

projecting, for each of the print primary color planes, the data cells along a horizontal direction and a vertical direction to find peaks in each direction which represent data cell center locations respectively, and based on locations of the peaks, creating a grid for that print primary color plane where each of its intersection is a respective data cell center location;

assigning a color to each grid intersection which corresponds to a respective data cell by examining values of each of the print primary color planes at locations of corresponding grid intersections of the respective grids for the print primary color planes; and decoding digital data from the data cells based on the respective color assigned to each data cell.

10. The method of claim 9, wherein the projecting step includes examining distances between data cell center locations in each direction to remove dubious peaks and/or to add missing data cell center locations by interpolation.

11. The method of claim 9, wherein the step of assigning a color assigns a color to a grid intersection the same as a color plane having a non-zero value at the grid intersection when there is only one color plane having a non-zero value at the grid intersection, assigns a color to a grid intersection the same as a color plane having a highest value at the grid intersection when there are two or more color planes having non-zero values at the grid intersection, or assigns white color to a grid intersection when there is no color plane having a non-zero value at the grid intersection.

12. The method of claim 9, wherein the color barcode further has at least one locator cell having a black color located along a border of the color barcode, the method further comprising localizing the color barcode using the locator cell.

13. The method of claim 9, wherein the step of separating the print primary color planes is performed using all data cells.

14. The method of claim 13, further comprising, before the assigning step, updating the separation of color barcode into print primary color planes using color information from the reference cells, and wherein the assigning step is performed using the updated print primary color planes.

15. A non-transitory computer readable recording medium having a computer readable program code embedded therein for controlling a data processing apparatus, the computer readable program code configured to cause the data processing apparatus to execute a process for decoding digital data in a color barcode printed on a hardcopy document, wherein the color barcode has a plurality of data cells each having a color that encodes data, and a plurality of reference cells with known colors located along each side of a border of the color barcode, the process comprising:

scanning the color barcode of the hardcopy document to obtain a color image;

separating the color image of the color barcode into print primary color planes;

computing spatial offsets among the print primary color planes using the reference cells on the border;

projecting, for a first one of the print primary color planes, the data cells along a horizontal direction and a vertical direction to find peaks in each direction which represent data cell center locations respectively, and based on locations of the peaks, creating a grid where each of its intersection is a respective data cell center location;

computing offset-compensated locations of grid intersections for each of the print primary color planes other than the first print primary color plane, by adding to the grid intersections the spatial offsets of the other print primary color plane relative to the first print primary color plane;

assigning a color to each grid intersection which corresponds to a respective data cell by examining values of the first print primary color plane at such location and values of each of the other print primary color planes at the respective offset-compensated locations; and decoding digital data from the data cells based on the respective color assigned to each data cell.

16. The non-transitory computer readable recording medium of claim 15, wherein the step of separating the print primary color planes comprises converting the color image to an HSV (Hue-Saturation-Value) or HSL (Hue-Saturation-Lightness) color space, and extracting a black (K) color plane from a V or L channel of the HSV or HSL color space with a first threshold.

17. The non-transitory computer readable recording medium of claim 16, wherein the step of separating the print primary color planes further comprises extracting peaks for the print primary color planes respectively from an H channel of the HSV or HSL color space.

18. The non-transitory computer readable recording medium of claim 15, wherein the projecting step includes examining distances between data cell center locations in each direction to remove dubious peaks and/or to add missing data cell center locations by interpolation.

19. The non-transitory computer readable recording medium of claim 15, wherein the step of assigning a color assigns a color to a grid intersection the same as a color plane having a non-zero value at the grid intersection when there is only one color plane having a non-zero value at the grid intersection, assigns a color to a grid intersection the same as a color plane having a highest value at the grid intersection when there are two or more color planes having non-zero values at the grid intersection, or assigns white color to a grid intersection when there is no color plane having a non-zero value at the grid intersection.

20. The non-transitory computer readable recording medium of claim 15, wherein at least one of the reference cells is a locator cell having a black color, the process further comprising localizing the color barcode using the locator cell.

21. The non-transitory computer readable recording medium of claim 15, wherein the step of separating the print primary color planes is performed using all data cells.

22. The non-transitory computer readable recording medium of claim 21, wherein the process further comprises, before the assigning step, updating the separation of color barcode into print primary color planes using color information from the reference cells, and wherein the assigning step is performed using the updated print primary color planes.

23. A non-transitory computer readable recording medium having a computer readable program code embedded therein for controlling a data processing apparatus, the computer readable program code configured to cause the data processing apparatus to execute a process for decoding digital data in a color barcode printed on a hardcopy document, wherein the color barcode has a plurality of data cells, the process comprising:

scanning the color barcode of the hardcopy document to obtain a color image;

separating the color image of the color barcode into print primary color planes;

projecting, for each of the print primary color planes, the data cells along a horizontal direction and a vertical direction to find peaks in each direction which represent data cell center locations respectively, and based on locations of the peaks, creating a grid for that print primary color plane where each of its intersection is a respective data cell center location;

assigning a color to each grid intersection which corresponds to a respective data cell by examining values of each of the print primary color planes at locations of corresponding grid intersections of the respective grids for the print primary color planes; and decoding digital data from the data cells based on the respective color assigned to each data cell.

24. The non-transitory computer readable recording medium of claim 23, wherein the projecting step includes examining distances between data cell center locations in each direction to remove dubious peaks and/or to add missing data cell center locations by interpolation.

25. The non-transitory computer readable recording medium of claim 23, wherein the step of assigning a color assigns a color to a grid intersection the same as a color plane having a non-zero value at the grid intersection when there is only one color plane having a non-zero value at the grid intersection, assigns a color to a grid intersection the same as a color plane having a highest value at the grid intersection when there are two or more color planes having non-zero values at the grid intersection, or assigns white color to a grid intersection when there is no color plane having a non-zero value at the grid intersection.

26. The non-transitory computer readable recording medium of claim 23, wherein the color barcode further has at least one locator cell having a black color located along a border of the color barcode, the method further comprising localizing the color barcode using the locator cell.

27. The non-transitory computer readable recording medium of claim 23, wherein the step of separating the print primary color planes is performed using all data cells.

28. The non-transitory computer readable recording medium of claim 27, wherein the process further comprises, before the assigning step, updating the separation of color barcode into print primary color planes using color information from the reference cells, and wherein the assigning step is performed using the updated print primary color planes.

* * * * *